May 19, 1964

B. A. BUSS 3,133,673

TIMER CONTROL FOR A WASHING MACHINE INGREDIENT DISPENSER

Filed Feb. 8, 1960

INVENTOR
BENJAMIN ALVIN BUSS

BY
Robertson and Smythe
ATTORNEYS

May 19, 1964 B. A. BUSS 3,133,673
TIMER CONTROL FOR A WASHING MACHINE INGREDIENT DISPENSER
Filed Feb. 8, 1960 4 Sheets-Sheet 2

INVENTOR
BENJAMIN ALVIN BUSS
BY
Robertson and Smythe
ATTORNEYS

INVENTOR
BENJAMIN ALVIN BUSS
BY
Robertson and Smythe
ATTORNEYS

May 19, 1964  B. A. BUSS  3,133,673
TIMER CONTROL FOR A WASHING MACHINE INGREDIENT DISPENSER
Filed Feb. 8, 1960  4 Sheets-Sheet 4

INVENTOR
BENJAMIN ALVIN BUSS
BY
Robertson & Smythe
ATTORNEYS

United States Patent Office 3,133,673
Patented May 19, 1964

3,133,673
TIMER CONTROL FOR A WASHING MACHINE INGREDIENT DISPENSER
Benjamin Alvin Buss, East Moline, Ill., assignor to Ametek, Inc., a corporation of Delaware
Filed Feb. 8, 1960, Ser. No. 7,321
5 Claims. (Cl. 222—70)

The present invention relates to automatic timer cycle controls especially adapted for washing machine ingredient dispensers, and particularly to a timer control means that can sequentially actuate a plurality of solenoid valves in an extremely versatile and flexible manner.

Although the present control can be used with facility to control any apparatus requiring sequential operations that are adapted to be readily changed, it will be shown and described as applied to a dispensing apparatus for commercial laundry machines and the like.

In such machines, various sequential operations are required to be performed by introducing various materials at predetermined times during a cycle of operation of the laundry machine itself. Thus, one or more sudsing operations may be required, after which other operations such as a bleach, a soap and others are necessary. It is often desirable to provide individual containers for holding the various detergents, bleaches and soap, and then automatically and thoroughly to mix such ingredients with a predetermined quantity of water prior to introducing them into the laundry machine.

It is an object of this invention to provide a cyclic control for automatically introducing water into containers holding such ingredients in any predetermined sequential order.

Another object of this invention is to provide a dispensing apparatus that will be flexible in nature.

Another object of this invention is to provide such a control in which one or more operations may be combined with others.

Another object of this invention is to provide a control for such a dispensing apparatus that will include a removable cam shaft containing replaceable cams for each ingredient to be controlled, and in which its cyclic operation is controlled by a control cam that periodically renders the various cams effective in a predetermined sequential order.

In one aspect of the invention, a dispensing unit may be attached to a laundry machine or the like comprising a shelf adapted to support a plurality of containers for separately containing the various detergents, bleach, soap, etc. The containers may be arranged such that each is located beneath a water line that includes a separate solenoid valve for controlling the amount of water introduced into the respective containers.

In another aspect of the invention, a control circuit may be provided which may include a cam shaft containing separate cams for each of the solenoid valves, and a timer motor for rotating the cam shaft a predetermined degree, the circuit being arranged so there are discrete movements of the shaft and cams.

In still another aspect of the invention, a separate cam may be driven for periodically starting and stopping the timer motor in a manner to maintain the automatic operation of the dispenser.

In still another aspect of the invention, means may be provided for manually turning the cam shaft to any predetermined rotary position so that a lesser or greater number of the ingredients may be used, depending upon the work to be accomplished.

The above, other objects and novel features of the invention will become apparent from the following specification and accompanying drawings which are merely exemplary.

Figure 1:
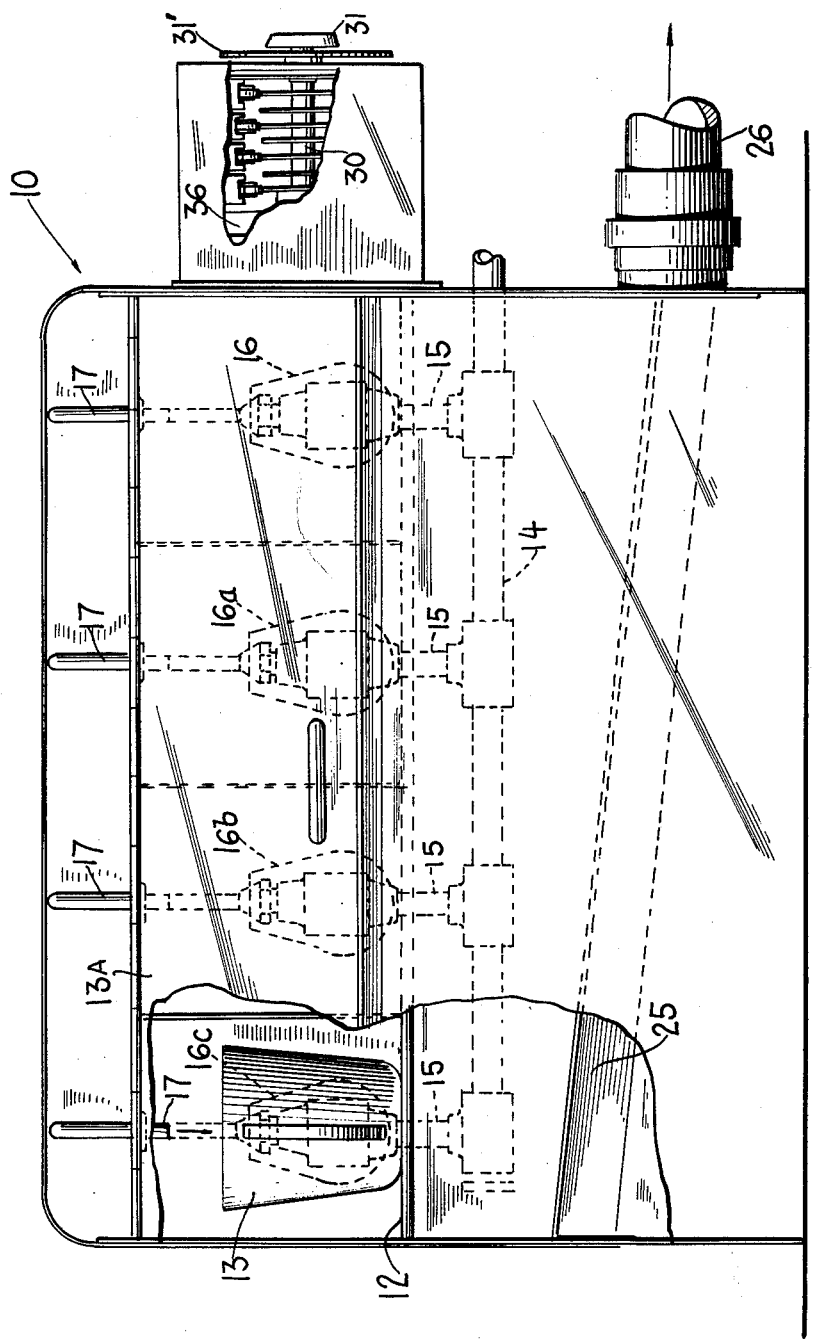
FIG. 1 is a broken side elevation view of a dispenser to which the principles of the invention have been applied.
Figure 2:
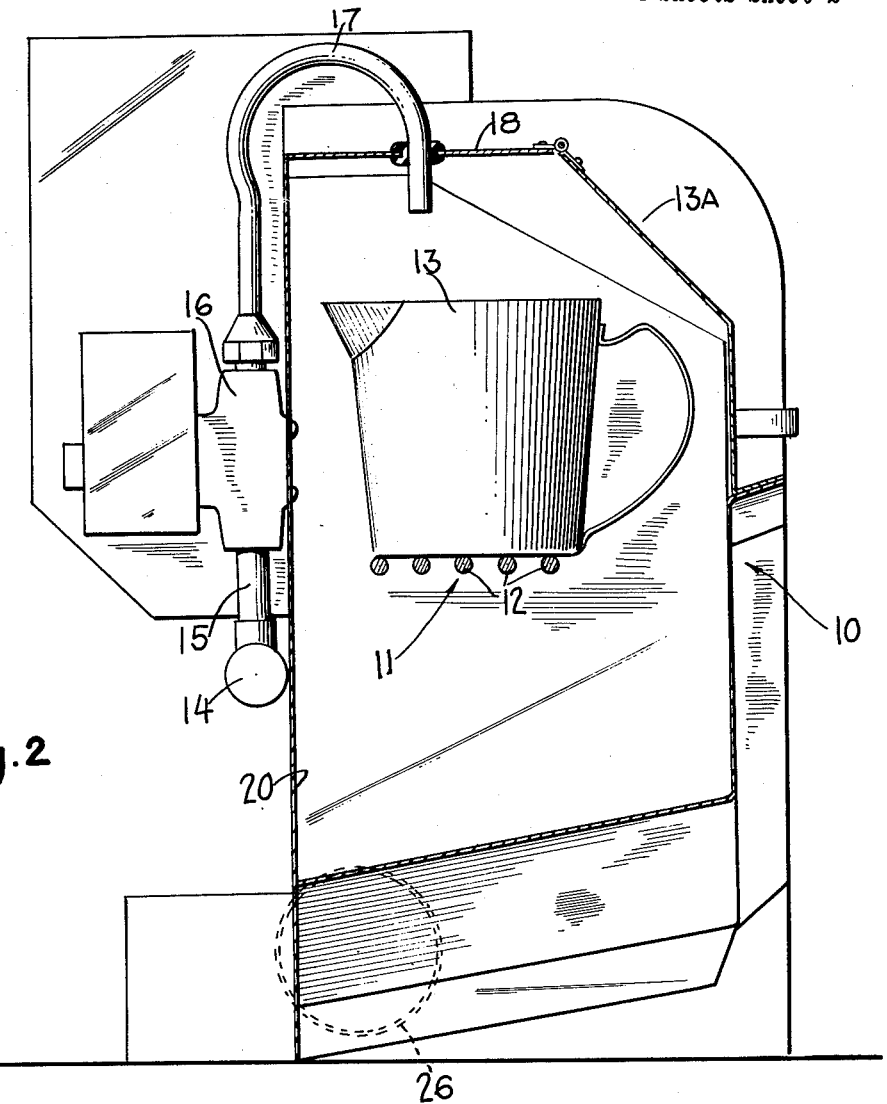
FIG. 2 is an end view of the dispenser shown in FIG. 1.
Figure 4:
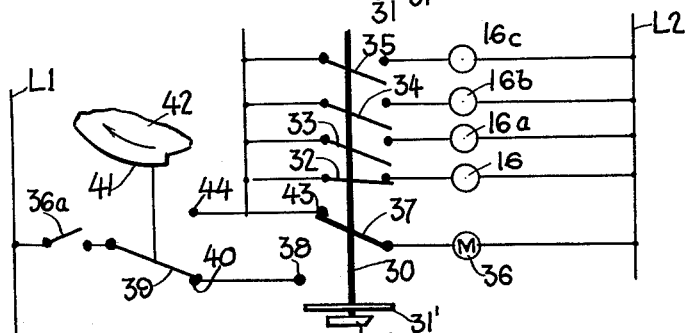
Figure 5:
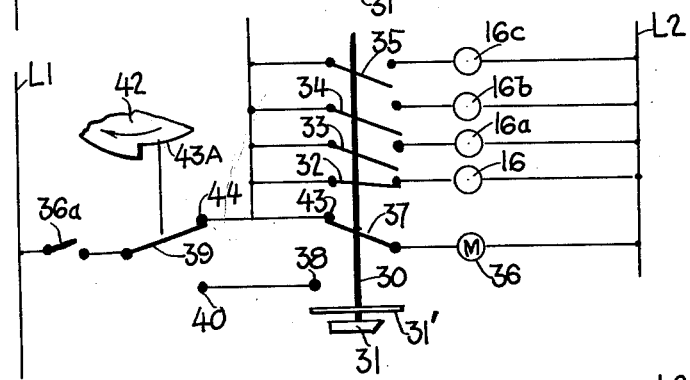
Figure 6:
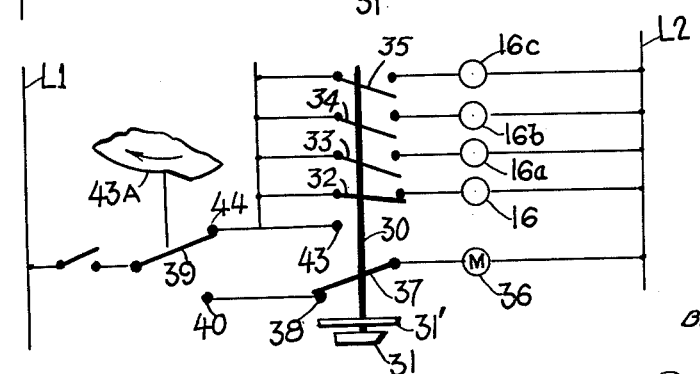
Figure 10:
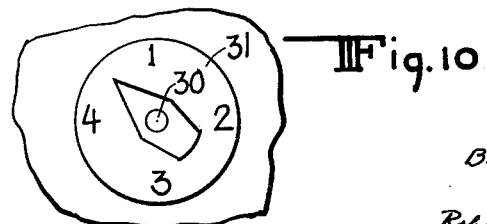

FIGS. 4 to 9, inclusive, are diagrams of the condition of the circuit of FIG. 4 in sequentially operating the dispenser of FIGS. 1 and 2;

FIG. 10 is a detail of the invention; and

Figure 11:
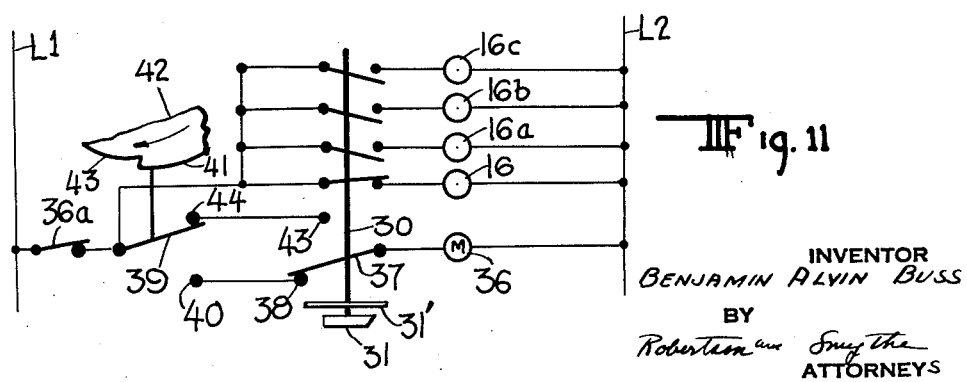

FIG. 11 is a modified form of the wiring diagram shown in FIGS. 4 to 9.

The invention may be used with various types of dispensers, one form being shown in FIGS. 1 and 2 wherein main casing 10 may be of generally rectangular cross section and made of sheet metal such as stainless steel or the like. The casing 10 may be of any desired length necessary to accommodate the selected number of ingredient containers or dispensing cups. It is shown long enough to support four containers, although it may be of any length to support any number of such containers.

A shelf 11 may extend longitudinally of casing 10 and it may be made of non-corrosive rods 12 arranged in spaced parallelism for supporting removable containers or cups 13. A hinged door 13A may be provided for inserting filled containers 13 prior to a dispensing operation.

A water line 14 may extend along one wall of the casing 10 and may include branches 15 leading upwardly to separate solenoid valves 16, 16A, 16B and 16C, one for each contaienr 13. A gooseneck outlet 17 may extend from each solenoid valve through the top 18 of casing 10, each being in alignment with its corresponding container 13.

The bottom wall 25 may be inclined transversely and toward one end of the casing 10 toward an outlet 26 that may be connected by a line to the interior of a laundry machine or the like.

Figure 3:
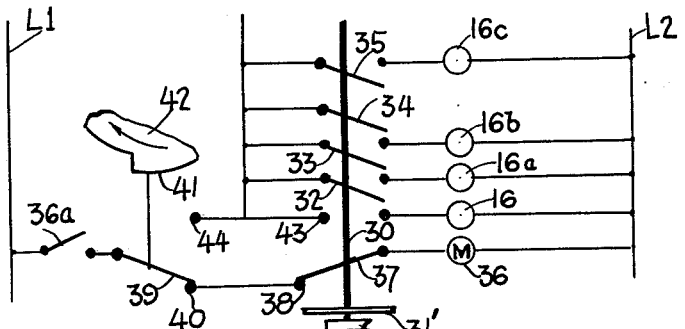
FIG. 3 is a schematic wiring diagram of an electrical circuit for sequentially operating the dispenser of FIGS. 1 and 2.

Referring to FIG. 3, a cam shaft 30 may include a handle or knob 31 for manually rotating the shaft 30 and a dial 31' for a purpose to be described later. The cam shaft 30 may include separate cams for each of four normally open switches 32, 33, 34 and 35 for energizing and de-energizing the solenoid valves 16, 16A, 16B and 16C.

The cam shaft may be connected to a timer motor 36 that is shown in FIG. 3 as being energized, when switch 36A is closed, by switch 37 closed on contact 38 and switch 39 being closed on contact 40. Switch 37 is closed by a land on a cam also mounted on cam shaft 30. Switch 39 is shown in FIG. 3 as being closed on contact 40 by a land 41 on a cam 42 that is separately driven in a clockwise direction by a timing device (not shown). Such a timing device may be part of the control for the remainder of the washing machine cycle such as shown in copending application Serial No. 645,573 filed March 12, 1957, and issued as U.S. Patent No. 2,934,614 on April 26, 1960.

When motor 36 is energized, it rotates the cam shaft 30 until a timer cam thereon moves switch 37 from the position shown in FIG. 3 to the position shown in FIG. 4 on contact 43, thereby stopping motor 36. While motor 36 is rotating, another cam on shaft 30 closes switch 32 (FIG. 4), but since switch 39 is still on contact 40 (FIG. 4), solenoid valve 16 will not be energized.

As cam 42 rotates clockwise a predetermined amount, a notch or lowered surface 43A thereon causes switch 39 to move to contact 44 (FIG. 5), thereby energizing solenoid valve 16 through closed switch 32 causing water to flow into the corresponding container 13 and mixing the ingredients therein, flushing it out of container 13 and down inclined bottom 25 (FIGS. 1, 2) to the outlet 26, thence into the laundry machine. Simultaneously, motor 36 is energized (FIG. 5) causing it to rotate cam shaft 30 so that switch 37 is moved from contact 43 to contact 38 (FIG. 6), thereby stopping motor 36. However, switch 39 is still on contact 44 (FIG. 6) so that solenoid 16 remains energized.

Figure 7:
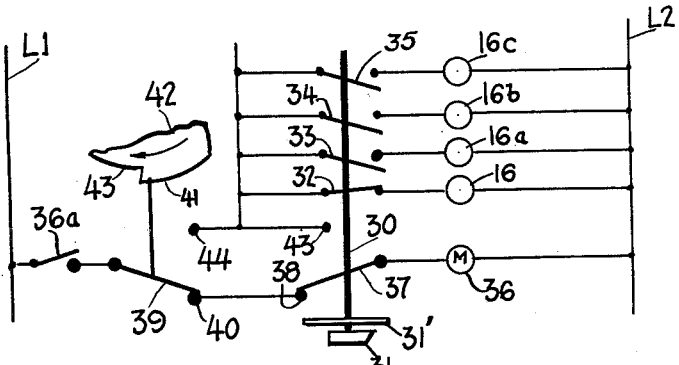
Figure 8:
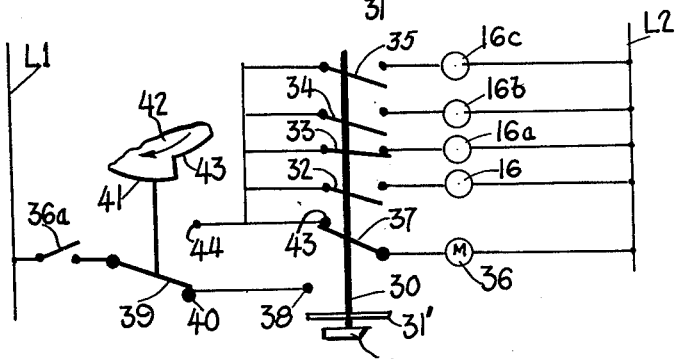
Figure 9:
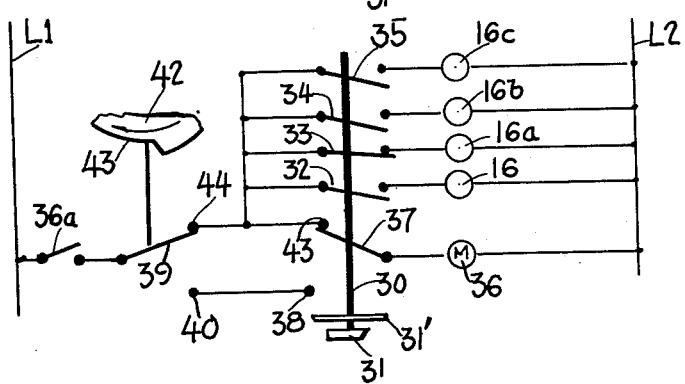

After a predetermined or selected interval, cam 42 moves clockwise so that switch 39 moves from contact 44 to contact 40, thereby de-energizing solenoid 16, and simultaneously again energizing motor 36 (FIG. 7). Energizing motor 36 causes it to rotate cam shaft 30 so that switch 37 moves from contact 38 to contact 43, thereby stopping motor 36 (FIG. 8). During this rotation of cam shaft 30, separate cams thereon open switch 32 and close switch 33. However, solenoid 16A is not then energized because switch 39 is on contact 40 and not on contact 44.

As cam 42 continues clockwise, the next depression on the cam causes switch 39 to move to contact 44, thereby energizing solenoid valve 16A (FIG. 9) and causing water to flow into the corresponding container 13 and to flush the aqueous mixture into the laundry machine as previously described. Simultaneously, motor 36 is again energized and the cycle repeats over and over again so that switches 34 and 35 as well as others that may be employed are sequentially closed, causing energizing of their corresponding solenoids 16B and 16C, flushing the aqueous mixtures into the laundry machine.

The handle 31 permits the user to manually set the cam shaft 30 at any desired point in its rotary path. Referring to FIG. 10, with the handle 30 in position so that the pointer is between 4 and 1, the electrical circuit is in the condition shown in FIG. 3; in fact, with the pointer between (not on) any two numbers, the circuit will be in this same condition of FIG. 3. Accordingly, closing switch 36A will start the automatic cycle which will continue until switch 36A is opened. This makes it possible for a user to use only one or more of the four operations described in one complete cycle, thereby providing a versatile, flexible control. Furthermore, the size of the lands and slots in the various cams may be made to suit any particular set of circumstances, and since the cam shaft 30 with its cams on it may be bodily replaced by another, a wide variety of cycles of sequential control is provided.

FIG. 11 shows a modified form of the circuit shown in FIGS. 4 to 9, inclusive, similar parts being given the same reference numerals. In FIG. 11, power is furnished to the valve solenoids 16, 16A to 16C, inclusive, directly from line L-1 by means of the disconnect switch 36A instead of through switch 39 as in FIGS. 4 to 9, inclusive. When switch 39 is closed on contact 40 by cam 42, the timer motor 36 will operate, moving switch 37 upward to contact 43. A short time before 37 is closed on contact 43, one of the valve solenoid switches that was closed will open. At this point, there is no energization of any of the valve solenoids. When switch 39 is closed on contact 44, timer motor 36 will be operated closing one of the valve solenoid switches. Timer motor 36 will continue to operate, moving switch 37 downward to contact 38, which will stop the motor 36 and cam shaft 30. The previously closed valve solenoid switch remains closed. The next time that cam 42 moves switch 39 to contact 40, motor 36 will again be energized and thereby turn cam shaft 30 to open the previously closed valve solenoid switch. Timer motor 36 will continue to operate until switch 37 is again closed on contact 43.

Although the various features of the new and improved cycle control for sequential operations have been shown and described in detail to fully disclose one embodiment of the invention, it will be evident that numerous changes may be made in such details and certain features may be used without others without departing from the principles of the invention.

What is claimed is:

1. In a laundry machine having a main timer means for causing the machine to follow a predetermined wash cycle, a controller for an ingredient dispensing device for laundry washing machines comprising a plurality of normally open switches, each in a circuit with a plurality of solenoid actuated valves for injecting ingredients into said machine, a cam shaft; separate cams on said cam shaft for operating each of said switches; a motor for rotating said cam shaft; and means for sequentially running said motor only during certain predetermined portions of time in the washer cycle to cause the injection of ingredients into said washer during said portion of time, said means including a cam on said shaft to stop the motor after a predetermined period of operation and a switch means responsive to said main timer means at a predetermined time in the washing cycle to start said motor.

2. In a laundry machine having a main timer means for causing the machine to follow a predetermined wash cycle, a controller for an ingredient dispensing device for laundry washing machines comprising a plurality of normally open switches, each in a circuit with a plurality of solenoid actuated valves for injecting ingredients into said machine, a removable cam shaft; separate cams on said cam shaft for operating each of said switches; a motor for rotating said cam shaft; and means for sequentially running said motor only during certain predetermined portions of time in the washer cycle to cause the injection of ingredients into said washer during said portion of time, said means including a cam on said shaft to stop the motor after a predetermined period of operation and a switch means responsive to said main timer means at a predetermined time in the washing cycle to start said motor, said cams being removable from said shaft to provide replacement when different ingredient injection periods are desired.

3. A controller for an ingredient dispensing device for laundry washing machines comprising a plurality of normally open switches, each in a circuit with a plurality of solenoid actuated valves for injecting ingredients into said machine, a cam shaft; separate cams on said cam shaft for operating each of said switches; a motor for rotating said cam shaft; means for sequentially running said motor only during certain predetermined portions of time in the washer cycle to cause the injection of ingredients into said washer during said portion of time, said means including a cam on said shaft to stop the motor after a predetermined period of operation and a switch means responsive to a predetermined timed indication from the washing cycle to start said motor; and a manual operator and indicator for turning said shaft to any desired position in its rotation cycle.

4. An ingredient dispensing apparatus for laundry washing machines comprising means supporting a plurality of separate ingredient containers and separate water lines leading to said containers, solenoid valve means in each of said water lines for controlling water flow to said container; a controller for said dispensing apparatus including a plurality of normally open switches, each in a circuit with one of the solenoids operating said valves, a cam shaft removably mounted in said controller, separate cams on said cam shaft for operating each of said switches; a timer motor for rotating said cam shaft; means for sequentially running said motor only during certain predetermined portions of time in the washer cycle to cause the injection of ingredients into said washer during said portion of time.

5. An ingredient dispensing apparatus for laundry washing machines comprising means supporting a plurality of separate ingredient containers and separate water lines leading to said containers, solenoid valve means in each of said water lines for controlling water flow to said container; a controller for said dispensing apparatus including a plurality of normally open switches, each in a circuit with one of the solenoids operating said valves, a cam shaft removably mounted in said controller, separate cams on said cam shaft for operating each of said switches; a timer motor for rotating said cam shaft; means for sequentially running said motor only during certain predetermined portions of time in the washer cycle to cause the injection of ingredients into said washer during said portion of time, said means including a cam on said shaft to stop the motor after a predetermined period of operation and a switch means responsive to a predetermined timed indication from the washing cycle to start said motor.

References Cited in the file of this patent

UNITED STATES PATENTS

| | | |
|---|---|---|
| 2,135,685 | Wells | Nov. 8, 1938 |
| 2,273,948 | Forslund | Feb. 24, 1942 |
| 2,312,950 | Zimarik | Mar. 2, 1943 |
| 2,427,396 | Farny | Sept. 16, 1947 |
| 2,534,014 | Gayring | Dec. 12, 1950 |
| 2,948,437 | Nielsen | Aug. 9, 1960 |
| 2,986,915 | Nau | June 6, 1961 |
| 3,086,379 | Plante | Apr. 23, 1963 |